US012627394B1

(12) United States Patent

Chavez

(10) Patent No.: US 12,627,394 B1

(45) Date of Patent: May 12, 2026

(54) ANGLE-OF-ARRIVAL OPEN-LOOP FREQUENCY-HOPPING COMMUNICATION SYSTEM

(71) Applicant: Rockwell Collins, Inc., Cedar Rapids, IA (US)

(72) Inventor: Carlos J. Chavez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 343 days.

(21) Appl. No.: 18/374,980

(22) Filed: Sep. 29, 2023

(51) Int. Cl.
H04K 3/00 (2006.01)
H04B 1/713 (2011.01)

(52) U.S. Cl.
CPC ............... H04K 3/25 (2013.01); H04B 1/713 (2013.01); H04K 3/43 (2013.01)

(58) Field of Classification Search
CPC ............. H04K 3/25; H04K 3/43; H04B 1/713
See application file for complete search history.

(56) References Cited

U.S. PATENT DOCUMENTS

| | | | |
|---|---|---|---|
| 7,804,449 | B2 | 9/2010 | Kennedy, Jr. et al. |
| 7,898,479 | B1 * | 3/2011 | VanLaningham ....... G01S 7/021 |
| | | | 342/442 |
| 7,961,147 | B1 * | 6/2011 | VanLaningham ....... G01S 3/043 |
| | | | 342/442 |
| 8,077,597 | B1 | 12/2011 | Frank et al. |

| | | | |
|---|---|---|---|
| 8,797,213 | B2 * | 8/2014 | Pun ......................... G01S 3/043 |
| | | | 342/442 |
| 9,523,761 | B1 * | 12/2016 | Hoffmann ................. G01S 3/46 |
| 11,143,735 | B2 | 10/2021 | Lehtimaki |
| 11,169,240 | B1 | 11/2021 | Shima |

FOREIGN PATENT DOCUMENTS

EP        0834748 A1    4/1998

OTHER PUBLICATIONS

USH292h1, Apparatus for the detection of angles-of-arrival of radio frequency signals, Jun. 2, 1987, expired.

* cited by examiner

*Primary Examiner* — Junpeng Chen
(74) *Attorney, Agent, or Firm* — Suiter Swantz IP

(57) ABSTRACT

A method and apparatus are provided for directional communication systems in tactical environments, utilizing frequency-hopping signals to enhance low-probability-of-intercept, -detection, and -geolocation (LPI/LPD/LPG) performance; along with anti-jamming (AJ) performance, multiple access, and performance in multipath channels. Because frequency-hopping signals vary their radio frequency from dwell-to-dwell, this prevents conventional angle-of-arrival (AOA) estimation based on phase-differences. This disclosure presents a technique for AOA estimation for frequency-hopping signals with techniques for combining phase-difference measurements from multiple frequency-hopping dwells to achieve high-performance AOA estimation.

18 Claims, 6 Drawing Sheets

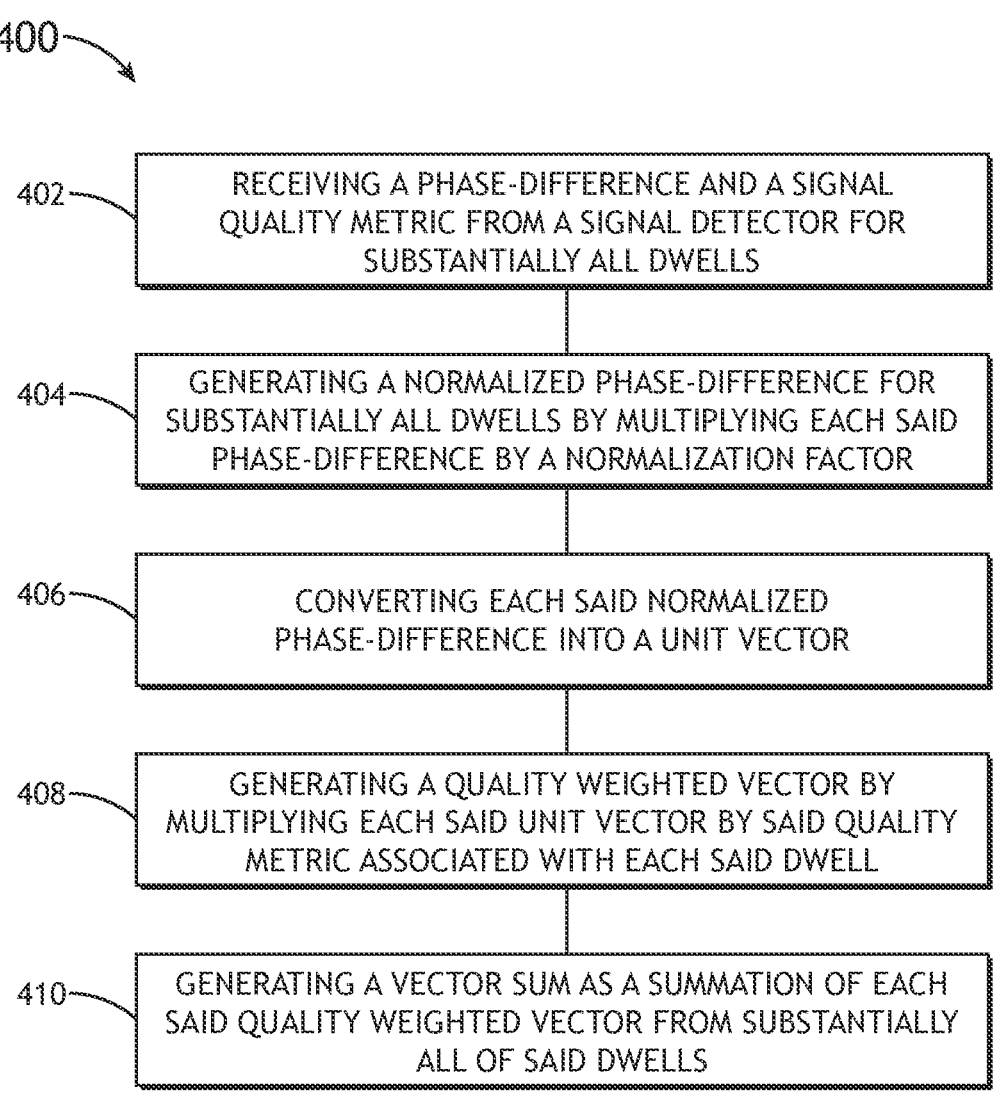

400

402 — RECEIVING A PHASE-DIFFERENCE AND A SIGNAL QUALITY METRIC FROM A SIGNAL DETECTOR FOR SUBSTANTIALLY ALL DWELLS

404 — GENERATING A NORMALIZED PHASE-DIFFERENCE FOR SUBSTANTIALLY ALL DWELLS BY MULTIPLYING EACH SAID PHASE-DIFFERENCE BY A NORMALIZATION FACTOR

406 — CONVERTING EACH SAID NORMALIZED PHASE-DIFFERENCE INTO A UNIT VECTOR

408 — GENERATING A QUALITY WEIGHTED VECTOR BY MULTIPLYING EACH SAID UNIT VECTOR BY SAID QUALITY METRIC ASSOCIATED WITH EACH SAID DWELL

410 — GENERATING A VECTOR SUM AS A SUMMATION OF EACH SAID QUALITY WEIGHTED VECTOR FROM SUBSTANTIALLY ALL OF SAID DWELLS

FIG.4

ANGLE-OF-ARRIVAL OPEN-LOOP FREQUENCY-HOPPING COMMUNICATION SYSTEM

FIELD

This disclosure is related broadly to communication system performance, and, more particularly, to method and apparatus for measuring and correcting errors in aperture pointing without the benefit of GNSS or other navigation systems.

BACKGROUND

Directional apertures offer enhanced communication system performance, including increased communication range, increased data rate, spatial rejection of interference, and spatial control of emissions. To realize these benefits, a directional communication system must point the aperture (whether mechanically or electronically) in the desired direction. Global satellite navigation systems (GNSS), along with attitude information, enable open-loop aperture pointing. However, GNSS may be unavailable or unreliable in many situations (e.g., urban canyon or electronically contested environments). Angle-of-arrival (AOA) estimation offers a means to measure the error in aperture pointing for feedback into a closed-loop tracking solution (such as a Kalman filter) in the absence of GNSS or other navigation systems.

For directional communication systems in tactical environments, frequency-hopping signals further enhance low-probability-of-intercept, -detection, and -geolocation (LPI/LPD/LPG) performance, anti-jamming (AJ) performance, multiple access, and performance in multipath channels. Because frequency-hopping signals vary their radio frequency from dwell to dwell, this presents a challenge for conventional AOA estimation based on phase-differences.

SUMMARY

The present disclosure teaches the utilization of combined phase-difference measurements from multiple frequency-hopping dwells to achieve high-performance angle-of-arrival estimation by, for example: (1) Normalizing phase-difference measurements to a common reference frequency; (2) Forming complex vectors from the normalized phase-difference measurements; and (3) Weighting the phase-difference unit vector from each dwell by its corresponding metric. Additionally, the present disclosure teaches methods and apparatus providing high-performance angle-of-arrival estimation for frequency-hopping signals by, for example: (1) Allowing measurements from disparate frequencies to be combined in kind; (2) Allowing phase-difference measurements to be combined while implicitly handling the fact that angles are defined on a circular interval; and (3) Optimizing performance by emphasizing measurements with high quality and de-emphasizing measurements with low quality.

Directional apertures offer enhanced communication system performance, including increased communication range, increased data rate, spatial rejection of interference, and spatial control of emissions. To realize these benefits, a directional communication system must point the aperture (whether mechanically or electronically) in the desired direction. Global satellite navigation systems (GNSS), along with attitude information, enable open-loop aperture pointing. However, GNSS may be unavailable or unreliable in many situations (e.g., urban canyon or electronically contested environments). Angle-of-arrival (AOA) estimation offers a means to measure the error in aperture pointing for feedback into a closed-loop tracking solution (such as a Kalman filter) in the absence of GNSS or other navigation systems. From prior art, the phase-difference $\phi$ as measured between two apertures (or sub-apertures of an aperture) can be used to estimate the angle-of-arrival $\theta$ in the aperture frame, given the distance d between apertures, the radio frequency f of the received signal, and the speed of radio frequency propagation c.

$$\theta = \arcsin\left(\frac{c}{2\pi f d}\phi\right)$$

For directional communication systems in tactical environments, frequency-hopping signals further enhance low-probability-of-intercept, -detection, and -geolocation (LPI/LPD/LPG) performance, anti-jamming (AJ) performance, multiple access, and performance in multipath channels. Because frequency-hopping signals vary their radio frequency from dwell to dwell, this presents a challenge for conventional AOA estimation based on phase-differences.

This disclosure presents a technique for AOA estimation for frequency-hopping signals. This technique combines phase-difference measurements from multiple frequency-hopping dwells to achieve high-performance AOA estimation.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 4 is a flow diagram of a method of practicing aspects of an exemplary open-loop communication system according to the present invention.

DETAILED DESCRIPTION

Figure 1A:
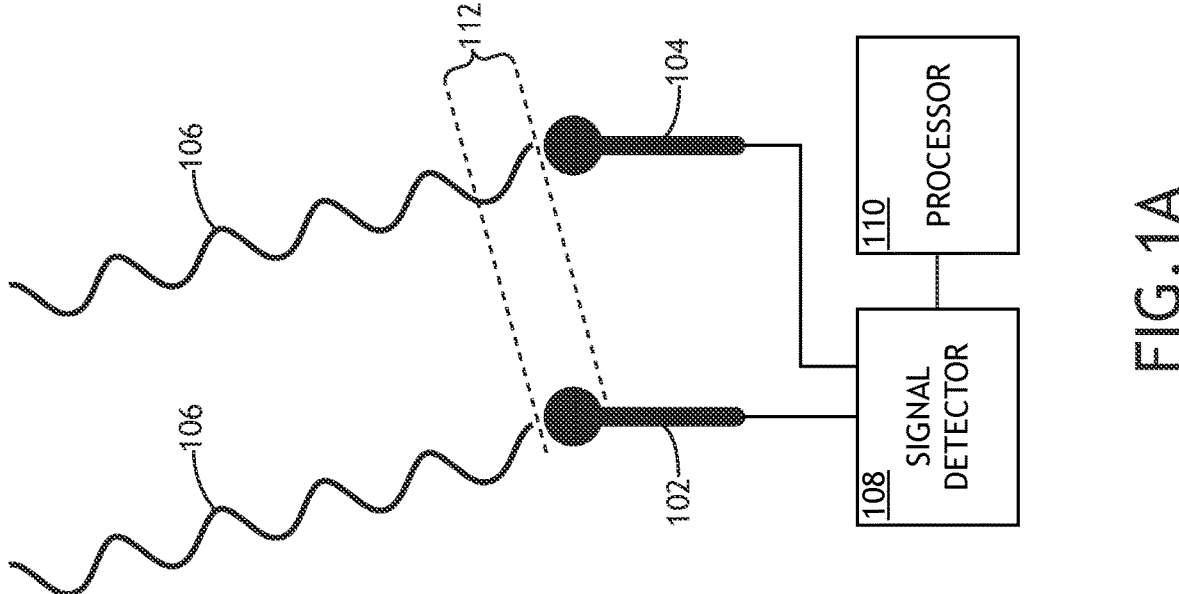
FIGS. 1A and 1B are highly diagrammatic illustrations of a pair of apertures or sub apertures in an open-loop communication system.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Directional communication systems and apparatus are desirable for their ability to provide high data rates over an extended distance. Spatial selectivity (energy direction) allows for a reduction in interference and reception discrimination provides desirable benefits in electronically contested or congested operating areas.

Pointing an aperture without a position source (e.g., GNSS or the like) requires aperture steering and tracking to maintain a closed loop. In highly maneuverable communication platforms and the like, attitude information is also required. In many instances, even where a position source such as GNSS is otherwise available, signal disruption (urban canyons, or an intentional or organic disruption) make directional open-loop communication unreliable or impossible.

Generally, angle-of-arrival (AOA) estimation begins with pointing an aperture (or sub-aperture) to an estimated position of a desired communication partner. Measuring pointing error can then be utilized in a feedback closed-loop tracking solution (e.g., a Kalman filter or the like). However, in spread spectrum networks, because frequency-hopping signals vary their radio frequency from dwell to dwell, conventional AOA based estimations utilizing phase differences are unsatisfactory.

With two apertures of known spacing (generalized to n apertures), the difference in measured phase-of-arrival at each aperture ($\phi$) can be used to derive a physical angle-of-arrival (of, e.g., a waveform with a sinusoidal carrier). A phase-difference angle (or fraction of a cycle) corresponds to a time-of-arrival difference. Thus, a wavefront with a known frequency encountered by spatially separated apertures at different times can be utilized to derive steering information. In a tactical environment or the like, frequency hopping is often utilized because of its enhanced robustness where interception, detection, jamming, or multipath are concerns. Further difficulties, in addition to frequency changes between communication pairs, arise from position and orientation changes between the pairs.

The figures illustrate various aspects of a solution to this problem and teach a technique for AOA estimation for frequency-hopping signals. The inputs consist of a phase-difference measurement and a metric for each frequency-hopping dwell. The metric may consist of an estimate of the signal-to-noise ratio (SNR) or other indication of signal quality. For each dwell, the phase-difference is scaled by a normalization factor to produce a normalized phase-difference. The normalization factor for the ith frequency-hopping dwell is equal to $$\frac{f_{ref}}{f_i},$$

where $f_{ref}$ is the reference frequency and $f_i$ is the radio frequency of the ith dwell. The reference frequency is typically chosen to be a frequency within the frequency-hopping band.

For each frequency-hopping dwell, the unit vector block produces a complex vector with unit magnitude and angle equal to the normalized phase-difference. A weighted vector is produced by multiplying the unit vector by the metric for that dwell. The weighted vectors from all frequency-hopping dwells are combined in the vector sum block to produce a combined vector. The vector phase of the combined vector is the combined phase-difference. The vector magnitude is the combined metric. The combined phase-difference $\phi_{comb}$ can be used to estimate the angle-of-arrival $\theta$ in the aperture frame, given the distance d between apertures and the reference frequency $f_{ref}$ used to normalize the phase-differences from each frequency-hopping dwell. The combined metric can be used to indicate the quality of the AOA estimate in subsequent processing (such as a Kalman filter closed-loop tracking solution).

Referring now to figures, directional communication system and apparatus are desirable for their ability to provide high data rates over an extended distance. Spatial selectivity (energy direction) allows for a reduction in interference and reception discrimination provide desirable benefits in electronically contested or congested operating areas.

As previously described, pointing an aperture without a position source (e.g., GNSS or the like) requires aperture steering and tracking to maintain n closed loop. This is especially true in highly maneuverable communication platforms and the like, where attitude information is also required.

Figure 1B:
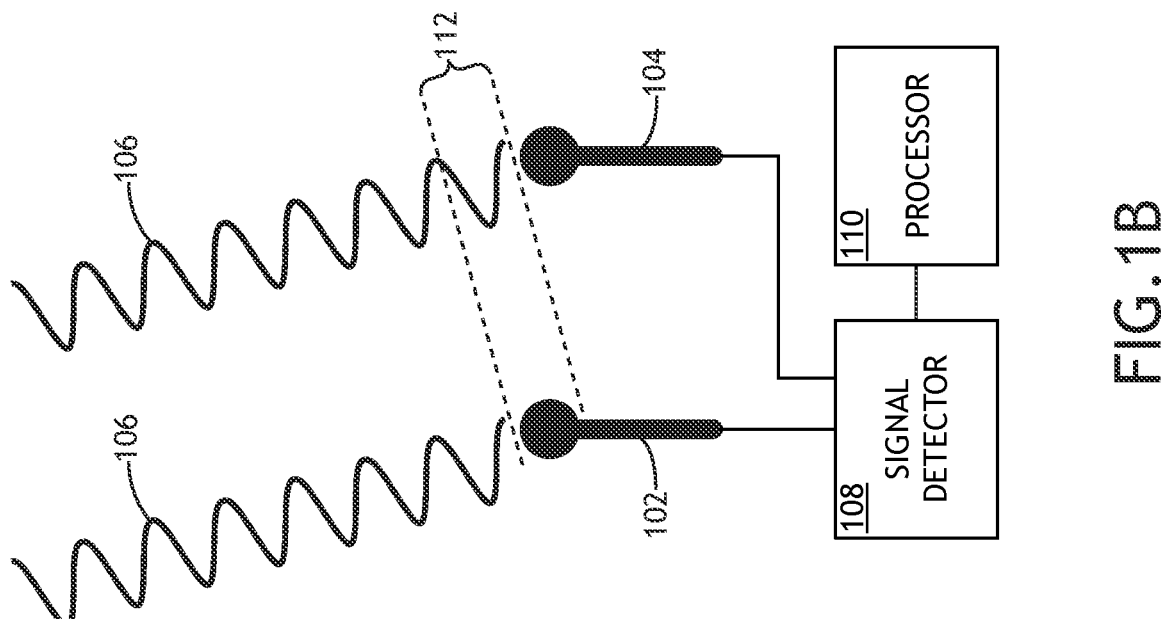

As illustrated in FIGS. 1A and 1B, by example, and diagrammatically, two apertures or sub apertures 102 and 104 have a difference in phase-of-arrival 112 of a signal waveform 106. A signal detector 108 may refer the signals for processing (processor 110) according to an embodiment of the invention (e.g., FIGS. 3 and 4).

Figure 2A:
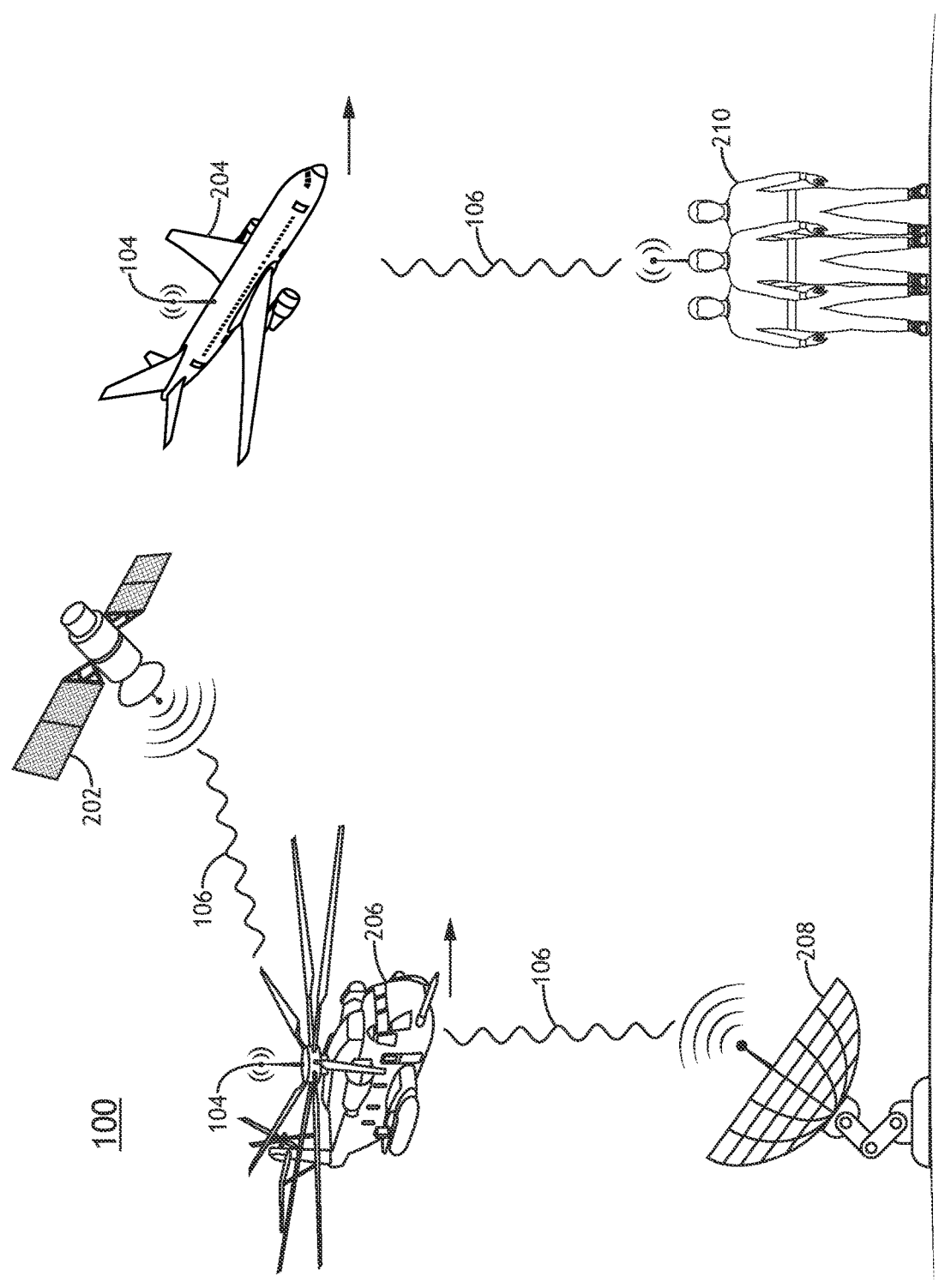
FIGS. 2A and 2B are highly diagrammatic environmental illustrations of an embodiment of various aspects of the present invention.
Figure 2B:
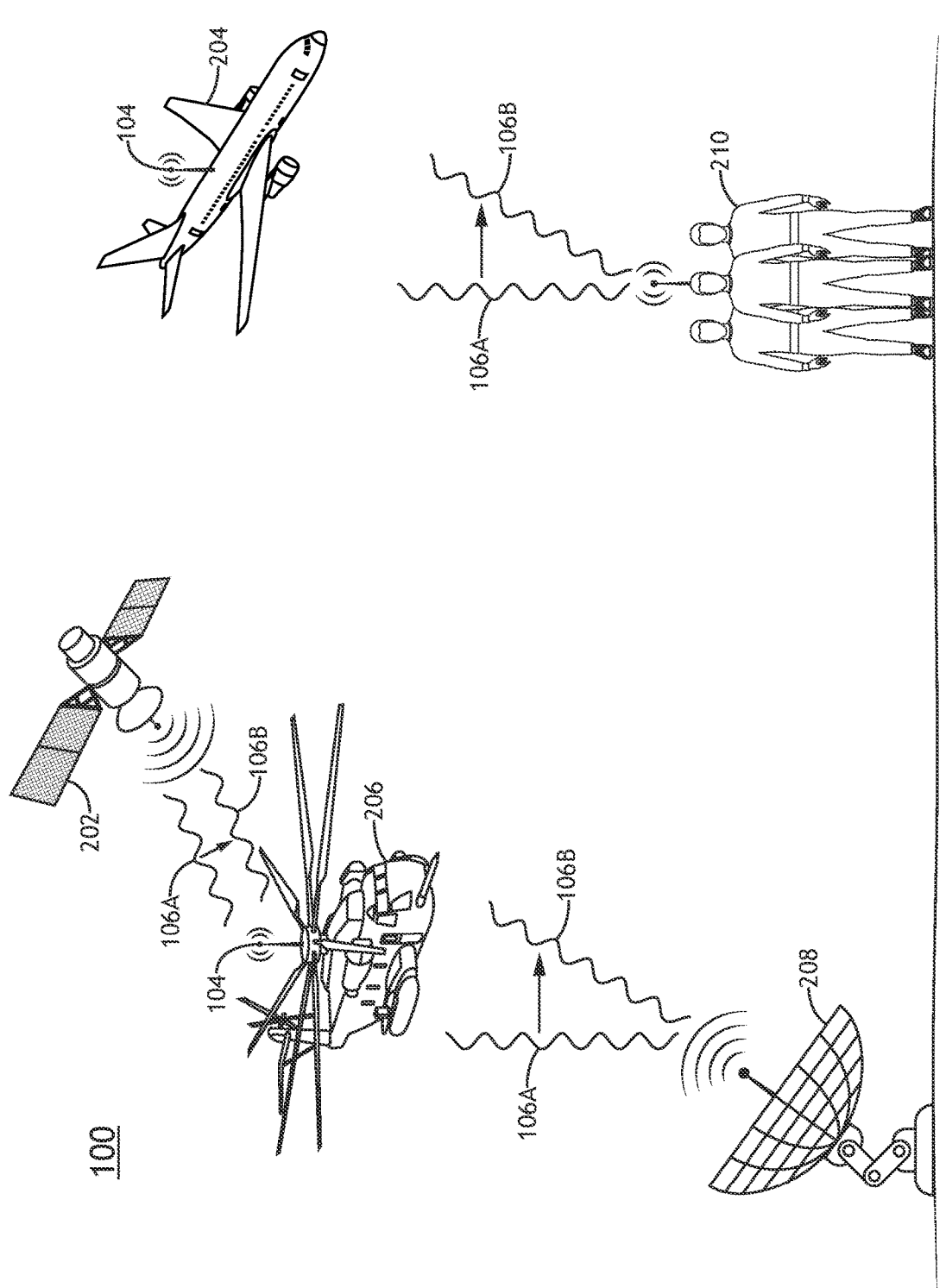

FIGS. 2A and 2B are diagrammatic illustrations of a communication environment in a benign or contested theater depicting open communication pairs (e.g., station 208 and helicopter 206; helicopter 206 and satellite 202; unit 210 and aircraft 204). It will be apparent to those skilled in the art that open communication links could likewise be created between, e.g., any of the referred to by example platforms (satellite 202, aircraft 204, helicopter 206, station 208, and unit 210). Likewise, as illustrated in FIGS. 2A and 2B, aperture pairs or sub pairs 104 and signals 106 (106A, 106B FIG. 2B) must overcome changes in platform position and aperture/platform attitude/orientation as well as weak or contested GNSS signals, for example jamming or disruption to reception at station 208 or terrain/obstacles (urban canyon) for unit 210. FIG. 2B illustrates how aperture pairs 104 may respond to a change in platform position to maintain open communication links.

Further difficulties, in addition to frequency changes between communication pairs, arises from position and orientation changes between the pairs. For each frequency-hopping dwell, a phase difference measurement at the apertures may then be analyzed. In some embodiments, it is preferred to also consider an additional characteristic (signal quality metric or the like) of each signal or a selection of a group of signals, e.g., signal-to-noise ratio (SNR). In some embodiments signal-power-to-total-power ratio may be utilized rather than SNR. In other embodiments, signal amplitude comparisons may be utilized instead of or in conjunction with one or more other signal quality metrics. The normalization factors and/or dwell phase shift angles may be compared to a reference frequency $f_{ref}$. The reference may be, for example, selected from some center range of the frequencies being utilized in the hop selection band. Other reference signal frequencies may also be utilized and selected by those skilled in the art to increase steering and/or aperture pointing accuracy.

For the same physical angle-of-arrival, the phase-difference 112 to be measured between the apertures is a function of the frequency. For example, a larger portion of the cycle can pass between wave front incidence differentially at each aperture for higher frequencies. This linear function of the frequency, the ratio of the received signal frequency to the reference frequency, can be accounted for according to a sensical normalization factor 306.

Figure 3:
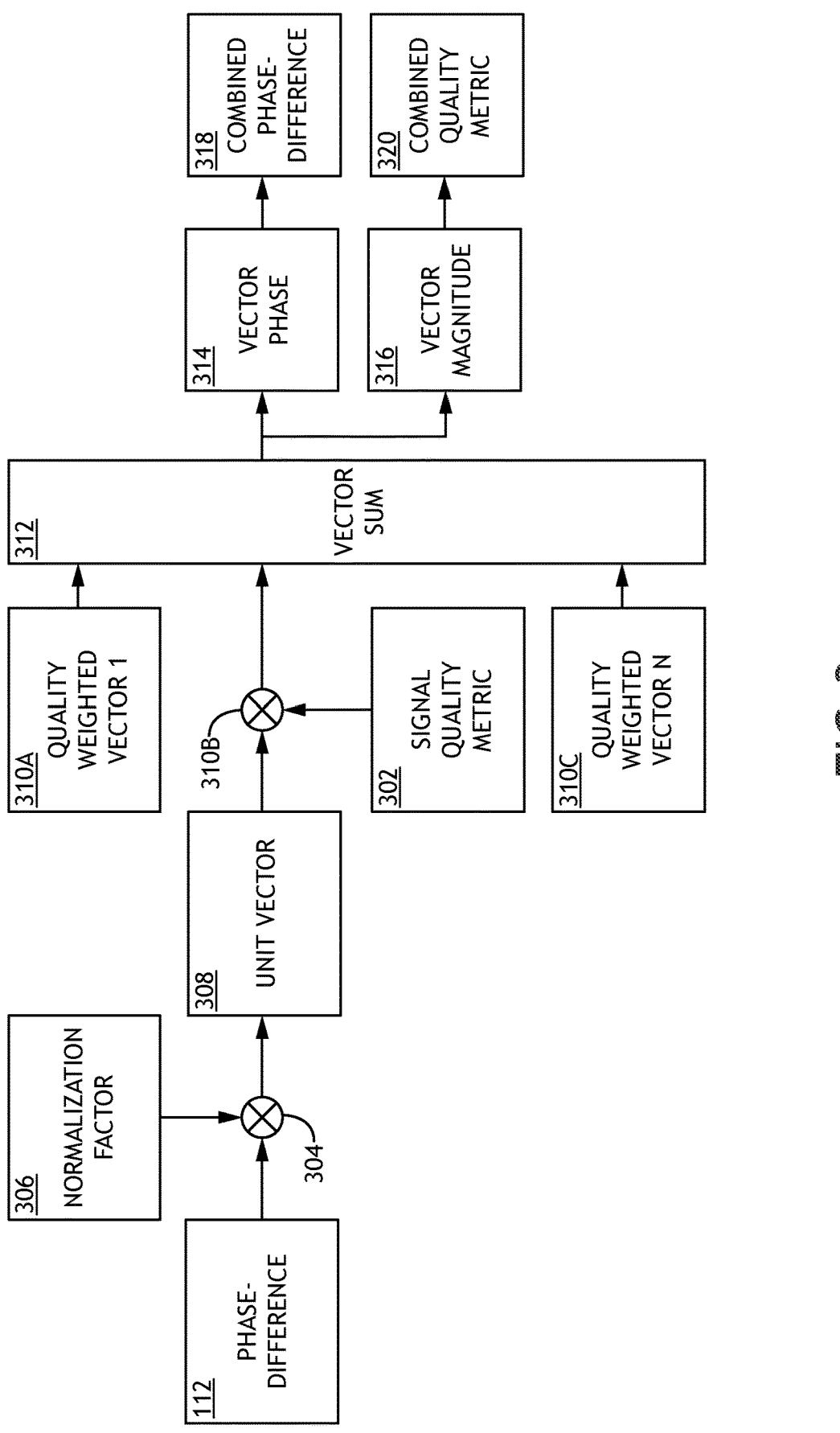
FIG. 3 is a block diagram of signal processing apparatus for an open-loop communication system of an embodiment of the present invention.

Turning to, e.g., FIG. 3, in a preferred embodiment the phase-difference gets multiplied by the normalization factor to determine a normalized phase-difference 304. For example, this is essentially the phase difference expected if the frequency was in fact the reference frequency $f_{ref}$. In operation a unit vector 308 is formed (a complex vector) having a real part and imaginary part that has a phase angle equal to the normalized phase-difference. The unit vector (308) formed has the determined angle with a radius of 1. The resulting normalized phase-difference unit vector is modified by a quality metric (multiplying the output of the unit vector). This changes the size of the vector, and the angle corresponds to the phase-difference as represented by a complex number. The quality of the signal aperture pointing error estimate is therefore represented by the radius of the vector. For each frequency hop the angle is calculated. The set of these complex vectors (e.g., 16 or the like) are summed 312 (e.g., addition of the real and imaginary vector components) 310B. Ideally, this results in a single output vector which may be analyzed to determine the vector phase and vector magnitude corresponding to a combined phase-difference and a combined metric (318, 320).

$$\theta = \arcsin\left(\frac{c}{2\pi f_{ref} d} \phi_{comb}\right)$$

The combined phase difference $\phi_{comb}$ may then be utilized to calculate a physical angle-of-arrival estimate and the combined metric represents the quality of the estimate for use in subsequent tracking algorithms for preparing updated angle-of-arrival estimates as communication pairs change position, and/or attitude.

Turning now to FIG. 4, a method of practicing aspects of the invention is described in seriatim. A phase-difference (FIG. 3, 112) and signal quality metric (FIG. 3, 302) 402 are received via a signal detector 108 for processing 110 for substantially all frequency dwells, e.g., where frequencies of each frequency-hopping signal change among a range of frequencies and where each hop dwells at a time (t) at each frequency. A normalized phase-difference 404 is then generated for a plurality of the dwells by, e.g., multiplying each said phase-difference by a normalization factor. The normalized phase-difference 404 may be converted into a unit vector 308, 406. A quality-weighted vector 408 (310A et al.) is preferably determined by multiplying each unit vector by the quality metric associated with each dwell. A vector sum is then generated 410 (312) as a summation of each quality-weighted vector from the plurality of dwells producing a combined phase-difference 318 from a vector phase 314 of the vector sum associated with a combined quality metric 320 from a vector magnitude of the vector sum 316.

It should be appreciated that normalizing the phase-difference measurements to a common frequency allows the measurements from disparate frequencies to be combined. This creates a value which is characterized as though it was derived from a single frequency. The complex vector value is formed from the normalized phase-difference measurements. This allows the phase difference measurements to be combined and implicitly accounts for the angles being on a circular interval. By deriving in the complex domain low quality is indicated by vectors not pointing in the same direction, whereas with good quality the vectors are pointing in the same direction (optimally piling up into a single long vector). This allows, for example, the present invention to make a quality assessment of the combined phase-difference 318 and combined quality metric 320. With a quality measurement of the estimated quality of vectors (e.g., 314, 316), a tracking filter may be directed to adjust how the derived estimates are used for continuously making angle measurements and adjustments. Thus, the processor 110 may be programmed to emphasize and deemphasize various aspects before summation and processing tracking solutions.

The technique described here enables high-performance angle-of-arrival estimation for frequency-hopping signals through the following means:

(1) Normalizing phase-difference measurements to a common reference frequency. This allows measurements from disparate frequencies to be combined in kind.

(2) Forming complex vectors from the normalized phase-difference measurements. This allows phase-difference measurements to be combined while implicitly handling the fact that angles are defined on a circular interval. This also produces a vector magnitude that corresponds to the consistency of the phase-difference measurements. The more similar the phase-differences are, the larger the resulting vector magnitude.

(3) Weighting the phase-difference unit vector from each dwell by its corresponding metric. This optimizes performance by emphasizing measurements with high quality and de-emphasizing measurements with low quality. This also results in a combined metric representing the overall quality of the combined phase-difference.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

The invention claimed is:

1. A system comprising:
  a directional aperture having at least two co-located apertures configured to receive at least one frequency-hopping signal from at least one transmitting source, wherein frequencies of each said frequency-hopping signal change among a range of frequencies within a set of frequency-hopping signals, each of said frequency-hopping signals within said set having a frequency dwell;
  at least one signal detector configured to:
    detect a phase-difference between phases-of-arrival from dwells received at said co-located apertures from said transmitting source of a plurality of said dwells; and
    generate a signal quality metric for said plurality of said dwells; and
  a processor configured to:
    receive said phase-difference and said signal quality metric for said plurality of dwells;
    generate a normalized phase-difference for each dwell by multiplying each said phase-difference by a normalization factor;
    convert each said normalized phase-difference into a unit vector;
    generate a quality weighted vector by multiplying each said unit vector by said signal quality metric associated with each said dwell; and
    generate a vector sum as a summation of each said quality weighted vector from each dwell;
  wherein a magnitude of the vector sum is associated with a combined quality metric and a phase of the vector sum associated with a combined-phase difference.

2. The system of claim 1, wherein said signal quality metric is generated by at least one of a measure of signal to noise, a measure of signal power to total power, or a signal amplitude.

3. The system of claim 1, wherein said normalization factor is a ratio of a reference frequency and a single frequency associated with said dwell.

4. The system of claim 3, wherein said combined phase-difference and said reference frequency are used to estimate an angle-of-arrival of said at least one frequency-hopping signal.

5. The system of claim 4, wherein said reference frequency is one within said range of frequencies for said frequency-hopping signals.

6. The system of claim 1, wherein said co-located apertures are sub-apertures of an aperture system.

7. The system of claim 1, wherein said combined quality metric and said combined phase-difference are inputs to further processing.

8. The system of claim 7, wherein said further processing comprises one of a Kalman filter closed-loop tracking solution.

9. A system comprising:
  an aperture having at least two co-located sub-apertures configured to receive at least one frequency-hopping signal from at least one transmitting source, wherein frequencies of each said frequency-hopping signal change among a range of frequencies within a set of frequency-hopping signals, each of said frequency-hopping signals within said set having a frequency dwell;
  at least one signal detector configured to:
    detect a phase-difference between phases-of-arrival from dwells received at said aperture from said transmitting source of a plurality of said dwells; and
    generate a signal-to-noise ratio for said plurality of said dwells; and
  a processor configured to:
    receive said phase-difference and said signal-to-noise ratio for said plurality of said dwells;
    generate a normalized phase-difference for said plurality of said dwells by multiplying each said phase-difference by a normalization factor, wherein said normalization factor is a ratio of a reference frequency and a single frequency associated with said dwell;
    convert each said normalized phase-difference into a unit vector;
    generate a quality weighted vector by multiplying each said unit vector by said signal-to-noise ratio associated with each said dwell; and
    generate a vector sum as a summation of each said quality weighted vector from each dwell;
  wherein a magnitude of the vector sum is associated with a combined quality metric and a phase of the vector sum associated with a combined phase-difference.

10. The system of claim 9, wherein said combined phase-difference and said reference frequency are used to estimate an angle-of-arrival of said at least one frequency-hopping signal.

11. The system of claim 9, wherein said reference frequency is one within said range of frequencies for said frequency-hopping signals.

12. The system of claim 9, wherein said co-located apertures are sub-apertures of an aperture system.

13. The system of claim 9, wherein said combined quality metric and said combined phase-difference are inputs to further processing.

14. The system of claim 13, wherein said further processing comprises one of a Kalman filter closed-loop tracking solution.

15. A method for determining an angle-of-arrival, comprising:

receiving via a signal detector associated with a directional aperture having at least a pair of co-located apertures or sub-apertures a phase-difference between phases-of-arrival for a plurality of dwells from a frequency-hopping signal;

generating a normalized phase-difference for said plurality of dwells by multiplying each said phase-difference by a normalization factor;

converting each said normalized phase-difference into a unit vector;

generating a quality weighted vector by multiplying each said unit vector by a quality metric associated with each said dwells; and generating a vector sum as a summation of each said quality weighted vector from said plurality of said dwells, wherein a magnitude of the vector sum is associated with a combined quality metric and a phase of the vector sum associated with a combined phase difference.

16. The method of claim 15, wherein said normalization factor is a ratio of a reference frequency and a single frequency associated with said dwell.

17. The method of claim 16, wherein said combined phase-difference and said reference frequency are used to estimate angle-of-arrival.

18. The method of claim 17, wherein said reference frequency is one within a range of frequencies for the frequency-hopping signals.

\* \* \* \* \*